United States Patent

[11] 3,571,706

| [72] | Inventor | Hakon Bjor<br>Oslo, Norway |
| --- | --- | --- |
| [21] | Appl. No. | 841,734 |
| [22] | Filed | July 15, 1969<br>Continuation-in-part of Ser. No. 610,928,<br>Jan. 23, 1967, abandoned. |
| [45] | Patented | Mar. 23, 1971 |
| [73] | Assignee | Sentralinstitutt For Industriell Forskning<br>Oslo, Norway |

[54] VOLTAGE MEASURING APPARATUS EMPLOYING FEEDBACK GAIN CONTROL TO OBTAIN A PREDETERMINED OUTPUT AND A FEEDBACK LOOP TO READOUT THE GAIN VALUE
6 Claims, 2 Drawing Figs.

[52] U.S. Cl. .................................................. 324/99,
324/123, 324/132, 328/26, 328/144
[51] Int. Cl. ..................................................... G01r 17/06,
G01r 15/10

[50] Field of Search.................................................. 324/99,
123, 100, 132; 346/32; 328/26, 144, 145

[56] References Cited
UNITED STATES PATENTS
3,159,787  1/1964  Sexton et al. .................. 324/99

Primary Examiner—Rudolph V. Rolinec
Assistant Examiner—Ernest F. Karlsen
Attorney—Albert M. Parker

ABSTRACT: An unknown signal is directly measured by means of an electronic circuit having no mechanical moving parts. The root means square values of unknown AC signals over large ranges are readily determined by measuring the amplification of a compressor in the circuit with a DC voltage signal separated from the measured signal by means of simple filters.

VOLTAGE MEASURING APPARATUS EMPLOYING FEEDBACK GAIN CONTROL TO OBTAIN A PREDETERMINED OUTPUT AND A FEEDBACK LOOP TO READOUT THE GAIN VALUE

The present invention relates to an electrical circuit for signal detection, including a variable transfer means having a signal transfer factor that can be adjusted by means of an electrical control signal supplied thereto.

Such circuits are known in different configuration. The most common circuits of this type are mechanically controlled and include mechanical movable elements, such as two motor driven potentiometers on the same shaft. The control signal is the current in the motor winding and the transfer factor, amplification factor or resistance value set can be read as an electrical signal. The one potentiometer thus represents the variable transfer means and the other is used for reading the value set, whereby a measure of an unknown signal supplied to the circuit is obtained.

An object of the invention is to provide a simple and reliable circuit of this type, including only electrical elements for rapid and direct measurements of the unknown signal and which permit circuit production by integrated circuit technology.

This is obtained by means of the circuit according to the invention which circuit comprises an input circuit including such variable transfer means at its input side, a first comparing circuit receiving a first reference signal and being connected through a signal converter to a circuit receiving a first transferred AC output signal from said transfer means, and a first amplifying circuit coupled from said first comparing circuit to said transfer means for supplying thereto a first amplified difference signal as said control signal, and comprising an output circuit that measures the signal transfer factor adjusted by supplying to the transfer means a measuring signal which is different from said first transferred signal either by frequency or time.

Preferably the output circuit includes a second comparing circuit receiving a second reference signal and being connected to a circuit receiving DC output signals from said transfer circuit, and a second amplifying circuit coupled from said second comparing circuit to the input side of said transfer means for supplying thereto a second amplified difference signal which simultaneously is a measure of an input AC signal supplied to said input side.

The AC and DC signals from the variable transfer means are conveniently separated by means of high pass and low pass filters, and these filters ought to be coupled to the output of said transfer means through an isolating circuit for separating these filters from the transfer means in such a manner that the division ratio remains the same for AC and DC signals.

The variable transfer means can be an amplifier, or a voltage divider the one branch of which including a fixed resistance and the other branch two terminals between which is coupled a resistance that can be varied in accordance with an electrical control signal supplied thereto. The variable resistance may be constituted of a thermistor including a heating element as previously known, or a light sensitive resistance etc. In one embodiment of the invention it has been found preferable to apply a field effect transistor as variable resistance, since such transistor, within a certain range, has a linear resistance between its source and drain electrodes, which can be varied by altering the gate-source potential.

It should be recognized that it is not necessary to know the relationship between the control signal and the transfer factor, and that the transfer factor set is determined by direct measurement with a separate signal that may be separated from the control signal either by frequency or time.

In order that the invention may be clearly understood and readily carried into effect, embodiments of the same will now be described, by way of examples, with reference to the drawings, of which:

Figure 1:
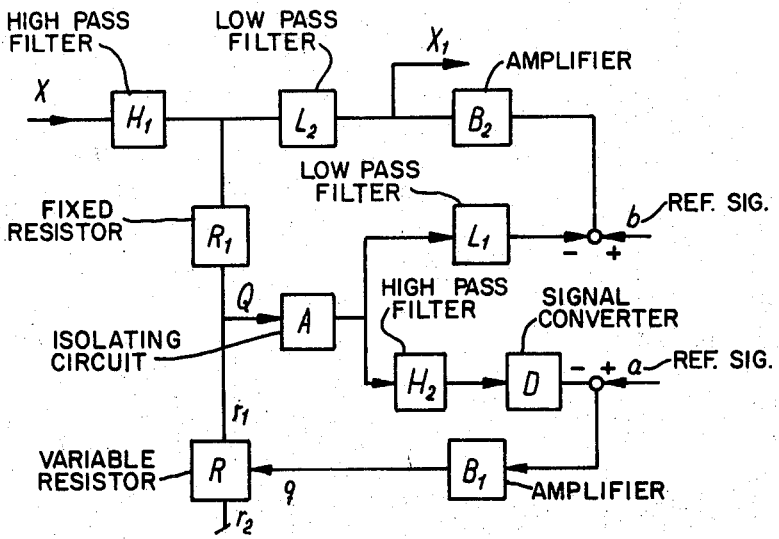
FIG. 1 is a block diagram of one embodiment of the invention.

The electrical circuit shown in FIG. 1 includes in its input circuit a variable transfer means in the form of a variable voltage divider which in its one branch includes a fixed resistance $R_1$ and in its other branch two terminals $r_1$ and $r_2$ between which is coupled an element R having a substantially linear resistance that can be varied in accordance with a control signal $q$ supplied thereto. An AC component from the voltage divider is fed to a first comparing circuit, for comparison with a reference signal $a$. This first comparison circuit includes a high pass filter $H_2$ which blocks DC voltages but allows AC voltage signals to pass unimpeded, and a signal converter D, for instance an r.m.s. value determining circuit. The first comparing circuit is coupled to the element R through an amplifier $B_1$ having a large amplification factor, for amplifying a first difference signal between the output signal from the circuit D and the reference $a$. This amplified difference signal is then supplied as the control signal $q$ to the linear ohmic resistance element R which is thus controlled in response to the signal $q$ until balance is achieved. Additionally, the electrical circuit comprises an output circuit with a low pass filter $L_1$, a second comparing circuit receiving a reference signal $b$ and a second amplifier $B_2$ coupled from the voltage divider to the input circuit. A DC voltage component from the voltage divider is fed to the second comparing circuit through the low pass filter $L_1$ for comparison with the reference voltage $b$. The cooperating low pass filter $L_1$ and high pass filter $H_2$ serve to separate the AC component from the DC component in a known manner, since the filter $H_2$ will not pass DC signals and the filter $L_1$ will not pass the AC components. The amplifier $B_2$ has a large amplification for amplifying a second difference signal between the output signal from the filter $L_1$ and the reference $b$. The amplified difference signal from the amplifier $B_2$ is superposed on an unknown AC signal X supplied to the circuit and becomes proportional to the r.m.s. value of this AC signal, in case the converter D is an r.m.s. value determining circuit. Thus the amplified second difference signal $X_1$ becomes a measuring signal of the unknown AC signal X.

The unknown AC signal $X$ is supplied to the voltage divider through a further high pass filter $H_1$, and a further low pass filter $L_2$ is coupled between the second amplifier $B_2$ and the resistance $R_1$ of the voltage divider. An isolating circuit A is included in order to separate the two filter circuits from the voltage divider in such a manner that the division ratio remains the same for AC and DC signals with respect to impedance.

The linear ohmic resistance is preferably a field effect transistor having its source and drain electrodes coupled between the terminals $r_1$ and $r_2$, while the gate electrode is coupled to the amplifier $B_1$.

The function of this circuit is now to be explained for a case in which the converter D is an r.m.s. value determining circuit:

The unknown AC voltage signal with an r.m.s. value $X$ is fed through the high pass filter $H_1$ to the voltage divider, and an attenuated AC signal is converted by the r.m.s. circuit D to a DC voltage for comparison with the reference DC voltage signal $a$. The difference signal from this comparison goes to the amplifier $B_1$. The output of amplifier $B_1$ sets the parameter $q$, controlling the resistance element R until balance is achieved.

When the amplification in $B_1$ is large, the first difference becomes small or negligible and the r.m.s. value of the AC voltage Q from the voltage divider can be considered as constant. If then the coefficient of division in the voltage divider is termed $\alpha$, the following equation is valid:

(1) $X \cdot \alpha = a$

In order to determine the coefficient of division $\alpha$, a DC voltage taken from the output of the amplifier $B_2$ is simultaneously impressed on the voltage divider. The DC voltage component at point Q is compared with a DC reference voltage signal $b$, and the difference is used to control the amplifier $B_2$.

Since the amplification in $B_2$ is large, the difference becomes small and the DC voltage component from the voltage divider can be considered as constant. The following equation is $b$ valid:

(2) $X_1 \cdot \alpha = b$

Combining equations (1) and (2) gives $$X_1 = \frac{b}{a} \cdot X$$

It is thus seen that by means of this electrical circuit proportionality can be obtained between the r.m.s value of the AC signal $X$ and the output signal $X_1$.

By means of the electrical circuit described, input AC signals may be converted to output DC signals in such a way that the DC signals are proportional to for instance the r.m.s. value of the AC signals. In case other signal converters than r.m.s. value determining circuits such as circuit D are used, this electrical circuit can be used to convert AC signals into DC signals where the DC signals are proportional to different values of the AC signals, such as the average value, the maximum value and so on, as well as to supply acoustic noise units in case apparatus for converting acoustic noise signals into electrical signals are used as the signal converter, as will now be described with reference to FIG. 2.

Figure 2:
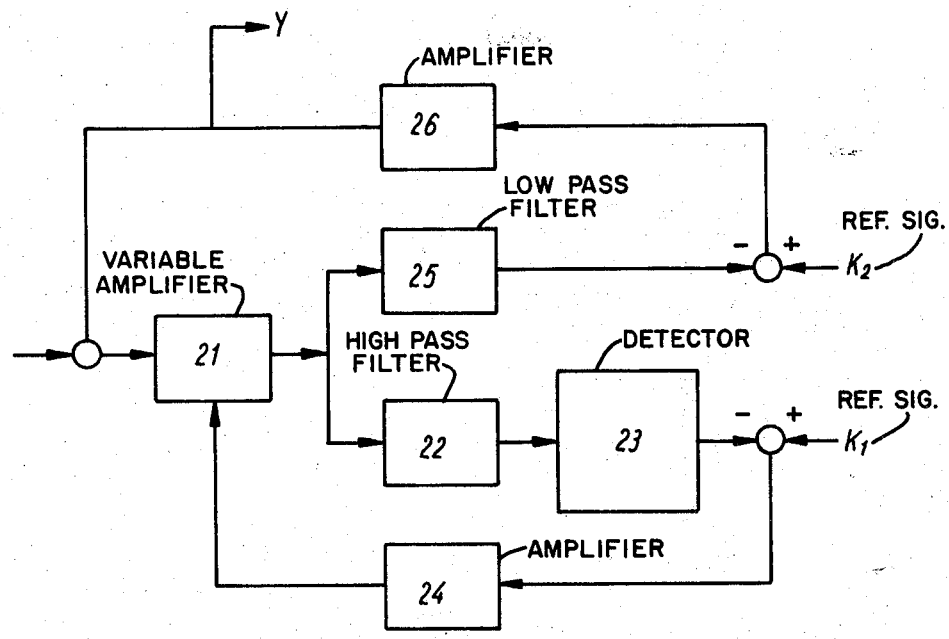
FIG. 2 represents another embodiment of the invention.

The electrical circuit shown in FIG. 2 comprises an input circuit receiving AC signals to be measured and including a variable amplifier 21 having an amplification that can be varied in accordance with an electrical control signal supplied thereto. The electrical device comprises further a high pass filter circuit including an apparatus 23 for detecting noise levels. The high pass filter circuit also includes a high pass filter 22 in front of the apparatus 23 and is coupled between the variable amplifier 21 and a comparing circuit receiving a reference signal $K_1$. Further, an amplifier 24 with a high degree of amplification is coupled between this comparing circuit and the variable amplifier 21 for amplifying a first difference signal and supplying this as a setting signal to the amplifier 21. Additionally, the circuit comprises an output circuit including a low pass filter circuit with a low pass filter 25 coupled from the amplifier 21 to a comparing circuit receiving a reference signal $K_2$. Further, an amplifier 26 with a high degree of amplification is coupled between the comparing circuit receiving the reference $K_2$, and the input terminal of the amplifier 21.

The AC signal from the variable amplifier 21, converted in the apparatus 23, is compared to the reference $K_1$ and the difference sets, through the amplifier 24, the variable amplifier 21 in such a manner that for instance the PNdB value of the AC output signal from the amplifier 21 becomes constant. The DC signal from the amplifier 21, through the filter 25, is compared to the reference $K_2$ and is amplified in the amplifier 26 in such a manner that the DC output signal from the amplifier 21 becomes constant. In this way a DC signal $Y$ becomes proportional to the level of an unknown AC signal to the device.

I claim:

1. Electrical circuit for the direct measurement of input AC voltage signals, comprising:
   a variable transfer means having a signal transfer factor adjustable in response to an electrical control signal applied thereto;
   a first comparing circuit receiving a first reference DC voltage signal for adjusting the transfer factor of the transfer means, said first comparing circuit including a signal converter for converting signals received from said transfer means and an amplifier with high amplification for amplifying a first difference signal resulting from the comparison of the first reference signal and the converted signals and passing on the amplified difference signal as said electrical control signal to the transfer means;
   A second comparing circuit receiving a second DC voltage signal for measuring the transfer factor of the transfer means, said second comparing circuit being adapted to compare signals received from the transfer means which are different from those received by said signal converter with said second reference signal;
   an amplifier with high amplification receiving a second difference signal resulting from the comparison in the second comparing circuit, the output of the amplifier being applied to the input of the transfer means so that the amplified second difference signals produced are a measure of the input AC voltage signals.

2. Electrical circuit as claimed in claim 1 wherein said transfer means is a voltage divider, the one branch of which including a fixed resistance and the other branch including two terminals between which are coupled a variable resistance that can be varied in accordance with a control signal supplied thereto, the variable resistance being a field effect transistor which is coupled between said terminals with its drain and source electrodes and whose gate electrode is arranged to receive said control signal.

3. Electrical circuit according to claim 1, wherein said signal converter is an r.m.s. value determining circuit.

4. Electrical circuit according to claim 2, wherein said signal converter is an r.m.s. value determining circuit.

5. Electrical circuit as claimed in claim 1, wherein said transfer means is a variable amplifier.

6. Electrical circuit as claimed in claim 5 wherein the signal converter is an acoustic noise detecting apparatus.